United States Patent [19]

Hayashi

[11] Patent Number: 5,729,756
[45] Date of Patent: Mar. 17, 1998

[54] TORUS NETWORKING METHOD AND APPARATUS HAVING A SWITCH FOR PERFORMING AN I/O OPERATION WITH AN EXTERNAL DEVICE AND CHANGING TORUS SIZE

[75] Inventor: Kenichi Hayashi, Kawasaki, Japan

[73] Assignee: Fujitsu Limited, Kawasaki, Japan

[21] Appl. No.: 641,694

[22] Filed: May 2, 1996

Related U.S. Application Data

[63] Continuation of Ser. No. 216,425, Mar. 23, 1994, abandoned.

[30] Foreign Application Priority Data

May 14, 1993 [JP] Japan ................. 5-113446

[51] Int. Cl.⁶ ........................................ G06F 13/00
[52] U.S. Cl. ........................... 395/800; 395/311
[58] Field of Search ................. 395/200.02, 200.1, 395/200.21, 311, 312, 800, 325; 370/60

[56] References Cited

U.S. PATENT DOCUMENTS

| | | | |
|---|---|---|---|
| 4,790,026 | 12/1988 | Gennery et al. | 382/303 |
| 4,811,214 | 3/1989 | Nosenchuck et al. | 395/800 |
| 4,933,933 | 6/1990 | Dally et al. | 370/60 |
| 4,942,517 | 7/1990 | Cok | 395/800 |
| 5,129,077 | 7/1992 | Hillis | 395/500 |
| 5,133,073 | 7/1992 | Jackson et al. | 395/800 |
| 5,175,865 | 12/1992 | Hillis | 395/800 |
| 5,224,100 | 6/1993 | Lee et al. | 370/94.3 |
| 5,280,474 | 1/1994 | Nickolls et al. | 370/60 |
| 5,301,104 | 4/1994 | Yalamanchili | 395/800 |
| 5,379,440 | 1/1995 | Kelly et al. | 395/800 |
| 5,471,580 | 11/1995 | Fujiwara et al. | 395/200.02 |

*Primary Examiner*—Parshotam S. Lall
*Assistant Examiner*—Viet Vu
*Attorney, Agent, or Firm*—Staas & Halsey

[57] ABSTRACT

A reconfigurable torus network system includes a switch section which is composed of switches for splitting an n-dimensional torus network into subunits or combining the subunits into the torus network and I/O switches having a hierarchical structure to couple the subunits to host computers and external devices. Each of these switches may be the same in arrangement as a processor-to-processor connection switch placed at each node (processor element) in the torus network. Since the I/O switches are connected hierarchically, the subunits can be used through host computers connected to the higher I/O switches. An interface with a host computer is provided for each of the subunits. Therefore, a plurality of users are allowed to use one parallel computer simultaneously. In addition, even if the number of available host computers are smaller than the number of the subunits, one host computer can act as a host for the subunits because the I/O switches are connected hierarchically. This allows a user to use the subunits simultaneously. In addition to host computers, each subunit can make access to higher external disk drives or other external devices.

18 Claims, 7 Drawing Sheets

[0] ~ [15] : PROCESSOR ELEMENT

: SWITCH (TURN)

: SWITCH (THRU)

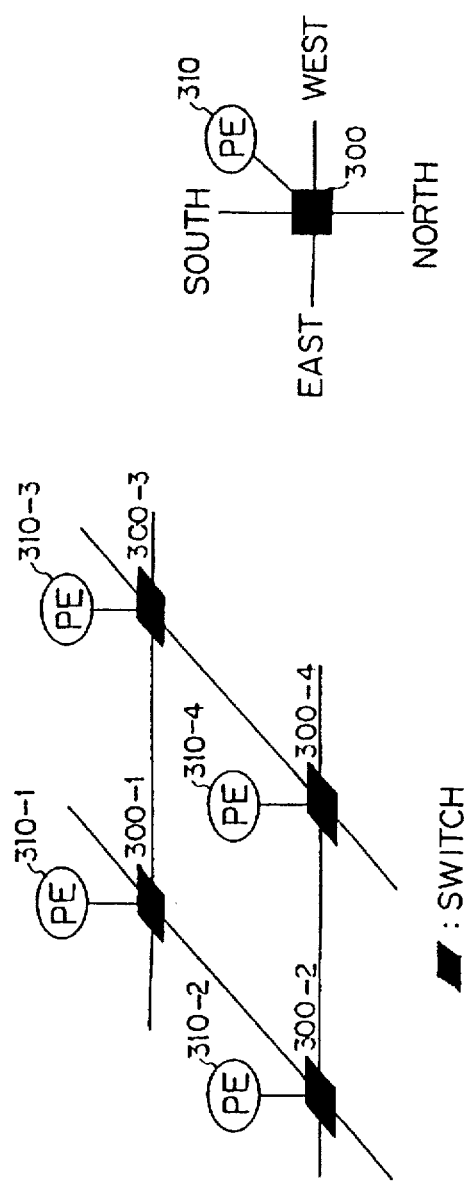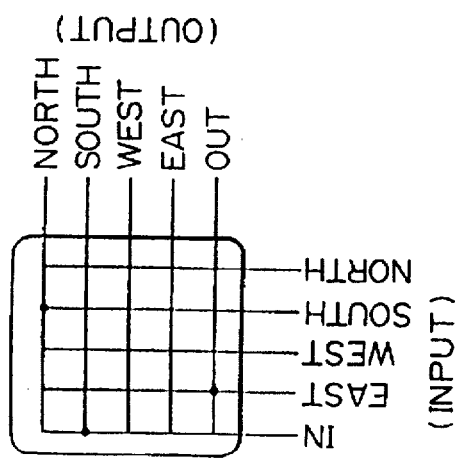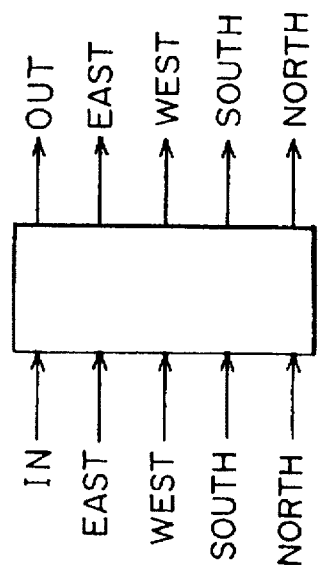
FIG. 5A
FIG. 5B
FIG. 5C

TORUS NETWORKING METHOD AND APPARATUS HAVING A SWITCH FOR PERFORMING AN I/O OPERATION WITH AN EXTERNAL DEVICE AND CHANGING TORUS SIZE

This application is a continuation, of application Ser. No. 08/216,425, filed Mar. 23, 1994, now abandoned.

BACKGROUND OF THE INVENTION

1. Field of the Invention

The present invention relates to a torus-network-based parallel computer in which multiple processors elements are interconnected in a torus network configuration and, more particularly, to a reconfigurable torus network system having a reconfiguration feature which splits or reconstructs the torus network and an input/output (I/O) system which has a facility for permitting flexible I/O operations among split torus subnetworks and between the torus subnetworks and external devices including host computers, external disk drives, etc.

2. Description of the Related Art

As a parallel computer configuration technique there is a torus network configuration. A torus network of low dimensions (two dimensions or three dimensions) is known as a parallel computer configuration which, of k-ary n-cube networks, has small delays and thus attains high throughput, provided the hardware cost is constant.

With parallel computers it is desirable that multiple processors be arranged into a plurality of processor groups for availability to a plurality of users. As a method of utilizing a torus network-based parallel computer as a plurality of systems, a system that is provided with switch means for making the parallel computer system reconfigurable is being applied for Patent (Japanese Patent Application Hei 05-074409 "Reconfigurable Torus Network"). This system, which is directed a torus-coupled network in which the ends of a mesh are connected together by a return path, permits subnetworks of the same phase to be reconfigured or reorganized with the return path distributed, the parallel computer to be made available to a plurality of users and moreover global calculations and broadcast processing to be performed at high speed.

FIG. 1 illustrates an example of a configuration of a parallel computer based on a reconfigurable torus network disclosed in the above-recited patent. The network is split into 4×4 subunits each of 4×4 processor elements, thus forming a 16×16 processor torus network. In this torus network, switches interposed between subunits can be changed over to link a plurality of subunits or separate liked subunits. The switches in the figure are all placed in the turn state (TURN), thereby arranging the 16×16 processor elements into 4×4 subunits. When the switches are set to the through state (THRU), on the other hand, the subunits are united.

In this system, however, when the network is split into subunits, each of them will become independent, resulting in loss of a communications path between every subunit. For this reason, the development of hardware was necessitated which provides the I/O interface between each of the subunits and a host computer or an external device such as a disk drive or display. If, however, I/O hardware were developed for each smallest unit of split, or for each subunit, there also would arise a problem that the number of subunits into which a torus network is split (16 in the case of FIG. 1) is limited to within the number of host computers available.

Thus, in the conventional system, a technique to implement an I/O interface between a torus network and host computers or external devices has become a problem to be solved.

SUMMARY OF THE INVENTION

It is therefore an object of the present invention to, in a parallel computer having a torus network, implement switches for splitting one system into a plurality of subsystems having the same torus network topology and an I/O interface between each subsystem and host computers or between each subsystem and external devices such as external storage devices without the development of any new hardware.

The present invention supposes a parallel computer based on a torus network. The torus network can be split into a plurality of subunits of the same topology, and, in each subunit, a plurality of processor elements are connected in a torus network configuration.

A switch section is provided for interfacing the processor elements in the torus network to host computers, external disk drives, and other external devices.

The switch section is composed of a plurality of switches which are interconnected hierarchically. Two types of switches are included. The switches of one type are splitting switches which are connected to nodes of the subunits to split the torus network into the subunits or combine the subunits into the torus network. The switches of the other type are I/O switches for connecting host computers, external disk drives, or other external devices to the subunits. Each of these switches can be implemented by a switch that is the same in arrangement as a processor-to-processor connection switch used at each processor element in the network.

In the present invention, a plurality of I/O switches are connected hierarchically, and the splitting switches are connected to the I/O switches at the lowest hierarchical level for connection to the subunits.

According to the present invention, the use of switches each of which is the same in arrangement as a processor-to-processor connection switch used at each node as the splitting switches is permitted to split a torus network into a plurality of subunits of the same network topology. Further, since the I/O switches are connected hierarchically, data can be transferred between each subunit and an external device connected to a higher I/O switch.

BRIEF DESCRIPTION OF THE DRAWINGS

Other objects and advantages of the present invention will be apparent from the following description of the preferred embodiment of the invention in conjunction with the accompanying drawings in which:

FIGS. 5A to 5C are diagram explanatory of switches within a processor element group;

DETAILED DESCRIPTION OF THE PREFERRED EMBODIMENTS

The Principle of the Invention

Figure 2:
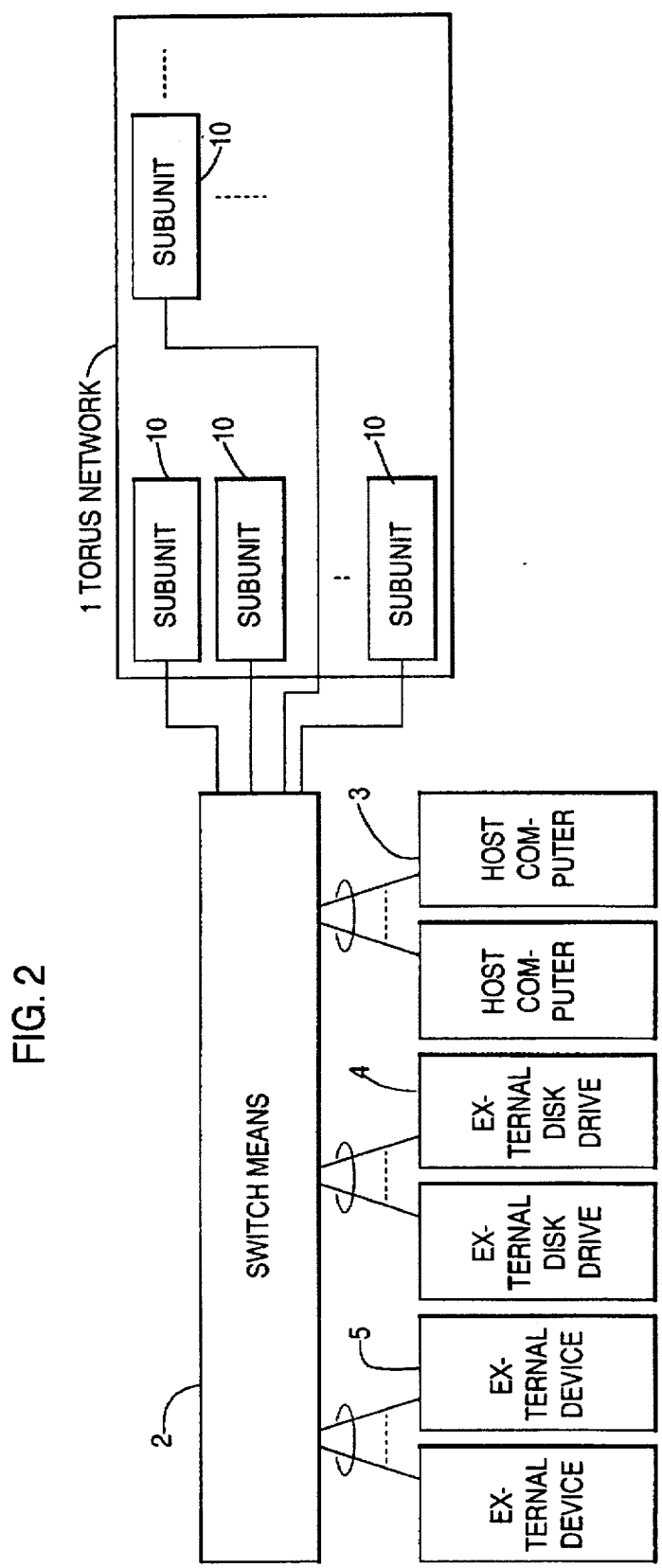
FIG. 2 is a basic block diagram Of the present invention.

FIG. 2 is a basic block diagram of the present invention.

The present invention supposes a parallel computer in which processor elements are interconnected in a torus network 1. The torus network 1 can be split into a plurality of subunits 10 of the same torus topology.

A switch means 2, which is composed of a plurality of hierarchically connected switches, is adapted to interface the processor elements in the torus network 1 with plural host computers 3, external disk drives 4, and other external devices 5.

The switch means 2 is composed of switches of two types. The switches of one type are splitting switches connected to nodes of subunits 10 constituting the torus network 1 and adapted to couple/separate the subunits 10. The switches of the other type are I/O switches for connecting the host computers 3, the external disk drives 4 and the external devices 5 to the subunits. The I/O switches are hierarchically connected, to the lowest hierarchical level of which the splitting switches are connected.

Figure 3:
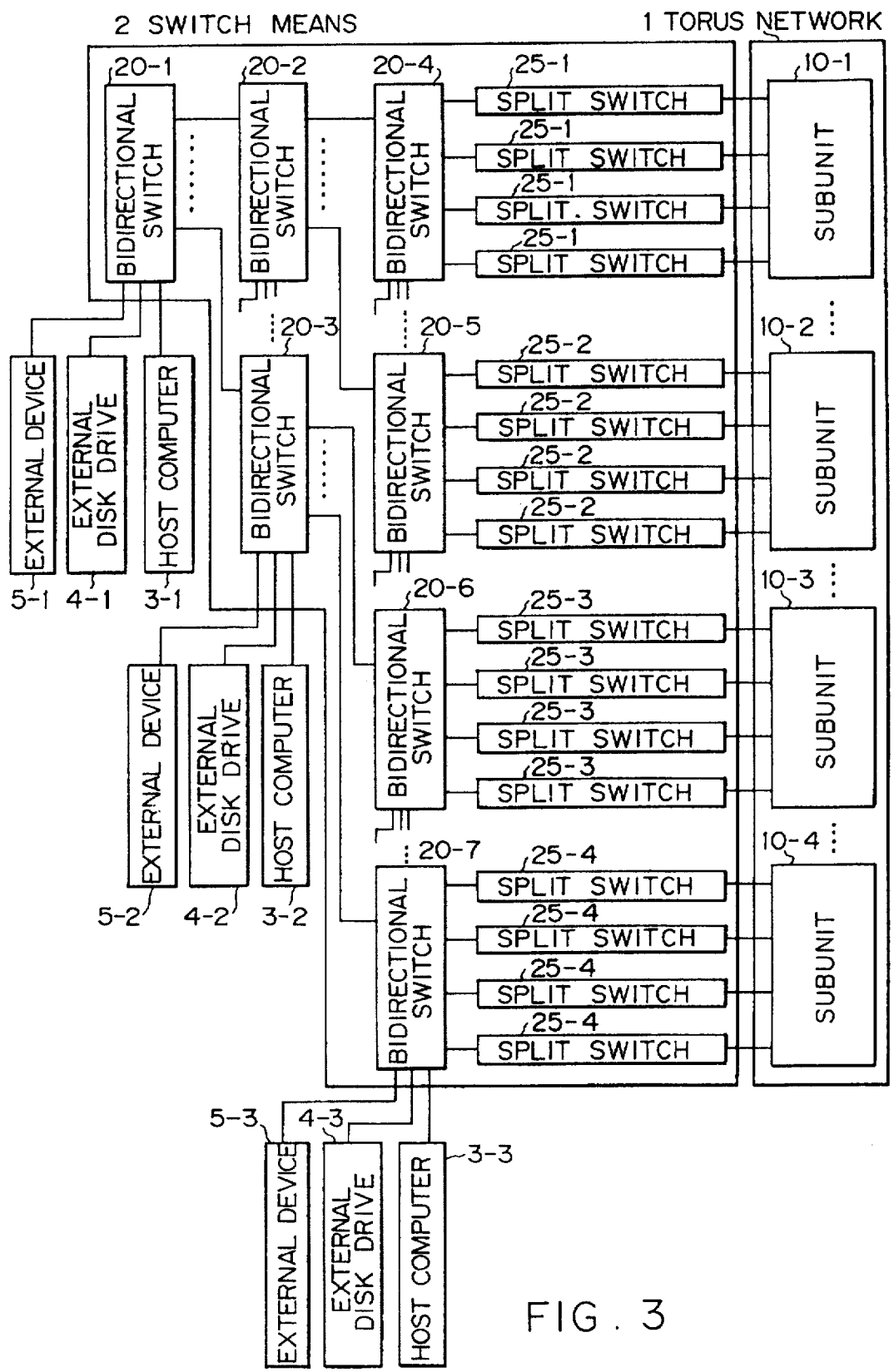
FIG. 3 is a diagram explanatory of the basic configuration of the present invention.

FIG. 3 is a diagram explanatory of the basic configuration of the present invention.

The torus network 1 is comprised of a plurality of subunits 10. The nodes within each subunit 10 and the splitting switches 25 in the switch means 2 are connected. The splitting switches 25 couple/separate the subunits 10 and connect the subunit to the corresponding bidirectional switch 20 serving as an I/O switch. A plurality of splitting switches 25 are connected to the bidirectional switches 20 at the lowest hierarchical level. A plurality of bidirectional switches 20 are interconnected to form a hierarchical structure of several levels. To each of arbitrary ones of the bidirectional switches 20 are connected a host computer 3, and an external disk drive 4 or another type of external device 5 such as High-Definition Television (HDTV), Video Tape Recorder (VTR), High Performance Parallel Interface (HIPPI), Ethernet, or the like.

The splitting switch 25 and the bidirectional switch 20 are each implemented by a switch which is the same in arrangement as that used at each node in the torus network.

The operation of the basic configuration will be described next.

A description is made of the case where processor elements at nodes within a subunit 10, for example, subunit 10-4, exchanges messages with external host computers 3. First, the splitting switches 25-4 are set so as to permit the subunit 10-4 to be connected to the bidirectional switch (namely, I/O switch) 20-7. Thereby, the interface is provided between the subunit 10-4 and the host computer 3—3 connected to the bidirectional switch 20-7. Since the bidirectional switches 20 are connected hierarchically, the processor elements within the subunit 10-4 can also be interfaced to the host computers 3-2 and 3-1 respectively connected to the bidirectional switches 20-3 and 20-1.

When, for example, a plurality of users attempt to use the subunits 10-1 to 10-4, which are respectively connected to the bidirectional switches 20-4 to 20-7 via the splitting switches 25-1 to 25-4, they are allowed to simultaneously use the host computer connected to the bidirectional switches 20-4 to 20-7 through split-use of the parallel computer.

A user at the host computer 3-1 connected to the high-order bidirectional switch 20-1 is allowed to use the subunits 10-1 to 10-4 placed under the bidirectional switch 20-1, and a user at the host computer 3-2 connected to the bidirectional switch 20-3 is allowed to use the subunits 10-3 and 10-4 placed under the bidirectional switch 20-3.

Since the bidirectional switches are connected hierarchically, even if host computers 3 are not connected to all the lowest bidirectional switches 20-4 to 20-7 (i.e., the number of the host computers is smaller than the number of the split subunits), the host computers 3 connected to the higher bidirectional switches 20 can act as hosts for the subunits 10. This permits all the subunits to be operated.

In addition to the host computers 3, external disk drives 4 and other external devices 5 are connected to the bidirectional switches 20. Thus, each subunit 10 can be interfaced to a higher external disk drive 4 and external device 5 to exchange data with them.

DESCRIPTION OF THE PREFERRED EMBODIMENT

Hereinafter, the preferred embodiment of the present invention will be described with reference to the drawings.

Figure 1:
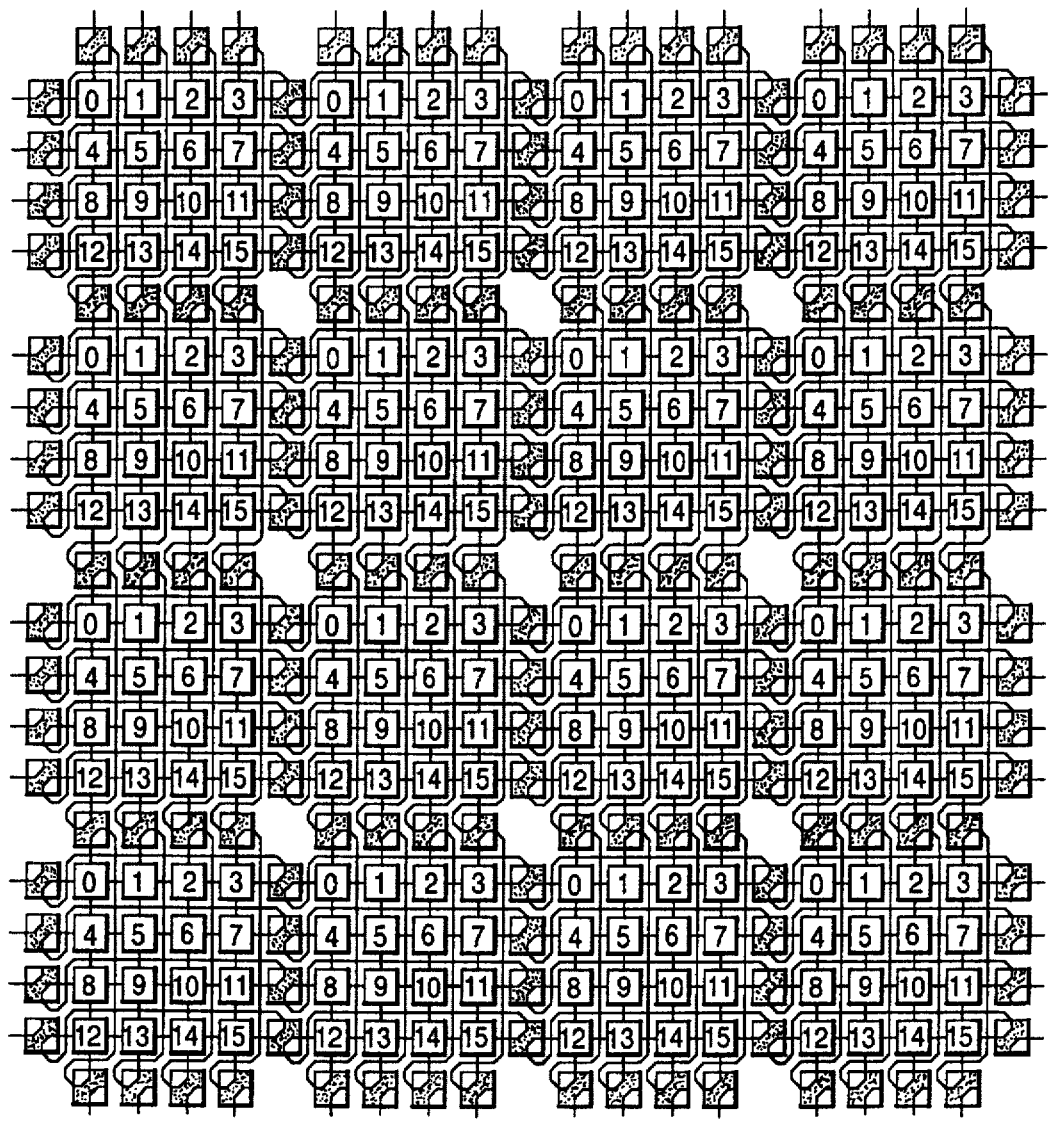
FIG. 1 illustrates a prior reconfigurable 16+16 torus network which is split into 16 subunits each of 4+4 processor elements.
Figure 4:
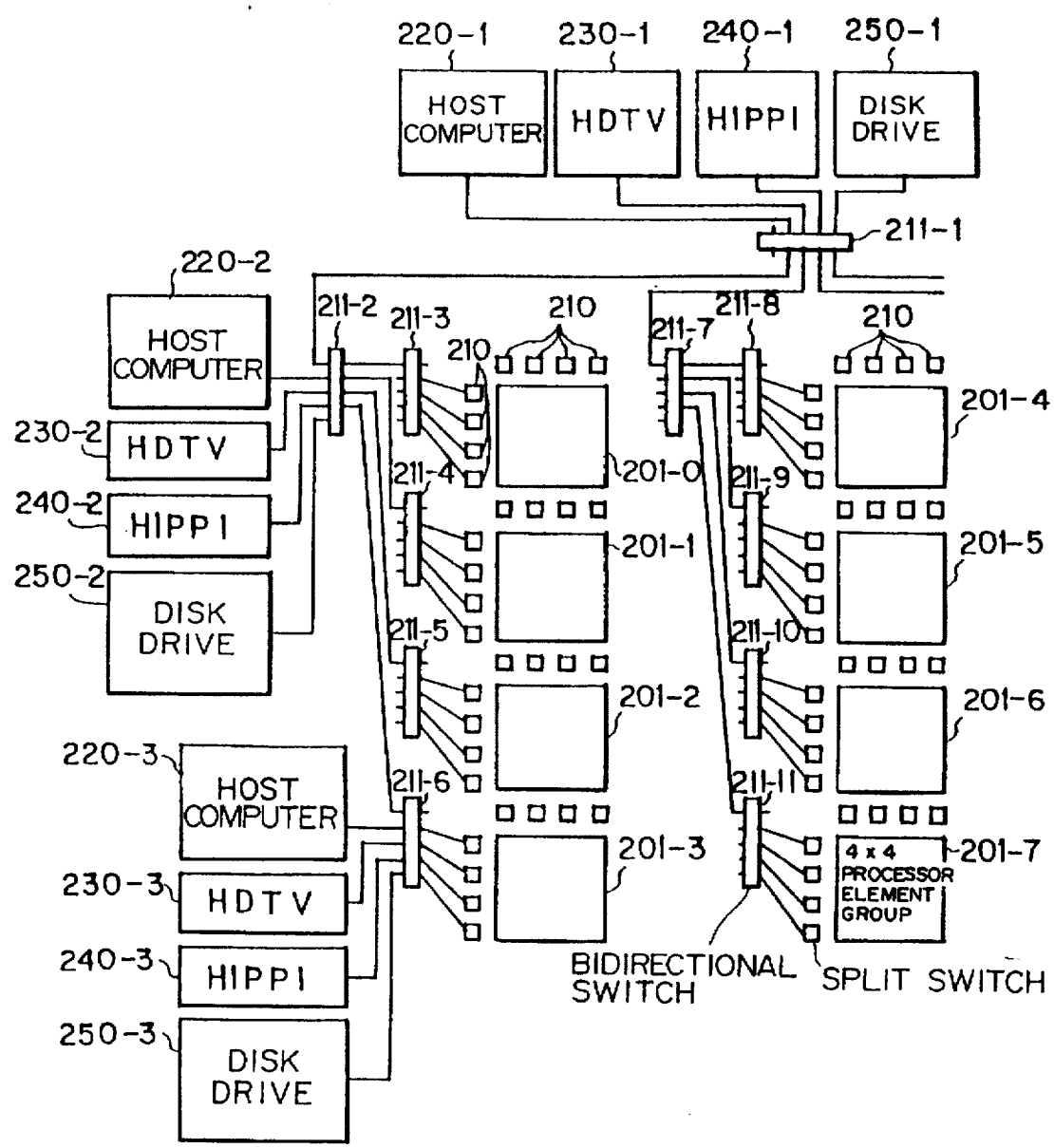
FIG. 4 illustrates a system configuration according to an embodiment of the present invention.

FIG. 4 illustrates a portion of a parallel computer having such a two-dimensional torus network with 16×16 processors as shown in FIG. 1 and an interface with host computers and external devices such as disk drives. In this figure, 4×4=16 nodes are made the minimum unit of split. That is, each of eight large square blocks (201-0 to 201-7) indicates a 4×4 node group (4×4 processor element group). The processor groups shown in FIG. 4 may be considered to be the left-hand eight processor groups of the 16 processor groups shown in FIG. 1.

On the other hand, small square blocks (210) indicate the splitting switches in FIG. 1, which are used to split or reconfigure the torus network. Each of these switches is a 5-input 5-output switch and can be implemented by, for example, a 5×5 crossbar switch. Rectangular blocks (211-1 to 211-11) indicate bidirectional switches which connect the torus network with host computers and external devices. Like the switches 210, these bidirectional switches are each a 5-input 5-output switch, which can also be implemented by a 5×5 crossbar switch. Those switches will be described later in more detail.

A description is made here of a method to connect the processor element groups (201-1 to 201-7) with the host computers (220-1 to 221-3) and external devices such as disk drives (250-1 to 25-3), HDTVs (230-1 to 23-3, High-Definition Television), and HIPPIs (240-1 to 240-3). It is one of the features of the present invention that the bidirectional switches 211 are connected hierarchically. In each bidirectional switch, of its five input terminals and five output terminals, four input terminals and one output terminal are used to form a quadruple tree structure for hierarchical connection. A host computer and external devices can be connected to any of the remaining output terminals.

In FIG. 4, a host computer 220-1, HDTV 230-1, HIPPI 240-1 and disk drive 250-1 are connected to the four output terminals of the bidirectional switch 211-1 the four input terminals of which, in turn, are each connected to one output terminal of a respective one of the other four bidirectional switches (211-2, 211-7, . . . ). To the other four output terminals of the bidirectional switch 211-2 are connected to another host computer 220-2, HDTV 230-2, HIPPI 240-2, and disk drive 250-2.

The four input terminals of the bidirectional switch 211-2 are respectively connected to the other bidirectional switches 211-3 to 211-6 at their output terminals. Likewise, the input terminals of the bidirectional switch 211-7 are respectively connected to the other bidirectional switches 211-8 to 211-11 at their output terminals. To the four remaining output terminals of the bidirectional switch 211-6 are connected to host computer 220-3, HDTV 230-3, HIPPI 240-3, and disk drive 250-3. Although, in FIG. 4, nothing is connected to the four remaining output terminals of each of the bidirectional switches other than the bidirectional switches 211-1, 211-2, and 211-6, it is also possible to connect a host computer and external devices thereto. Finally, the four input terminals of each of the bidirectional switches 211-3 to 211-6, 211-8 to 211-11 are each connected to one of five output terminals of a respective one of the switches 210 for splitting reconfiguring the torus network.

By hierarchically connecting the host computers and the external devices in that manner through the use of the plural bidirectional switches, flexible connections between the processor element groups of the parallel computer and the host computers or the external devices can be made.

That is, in order to permit a processor element in the processor element group 201-3 to write in or read from the external disk drive 250-3, that processor has only to be connected to the bidirectional switch 211-6 through one of the four torus network splitting switches 210 associated with the processor group 201-3. Also, in order to permit a processor element in the processor element group 201-3 to communicate with the host computer 220-1, it is required that the bidirectional switch 211-6 be connected to the host computer 220-1 through the bidirectional switches 211-2 and 211-1 after connecting the processor to the bidirectional switch 211-6 through one of the four torus network splitting switches 210 associated with the processor group 201-3.

Hierarchical connections of host computer and external device provide flexibility in the selection of connections between processor groups and host computers, external devices. A host computer and other external devices can also be provided for each of the processor element groups, for four processor element groups, or 16 processor element groups. In this connection, in FIG. 4, host computer 220-1, HDTV 230-1, HIPPI 240-1 and disk drive 250-1 are provided for 16 processor element groups 201-0 to 201-15, host computer 220-2, HDTV 230-2, HIPPI 240-2 and disk drive 250-2 for four processor element groups 201-0 to 201-3, and host computer 220-3, HDTV 230-3, HIPPI 240-3 and disk drive 250-3 for one processor element group 201-3.

Next, the switches (switches shown as square and rectangular in shape in FIG. 4) will be described in detail.

These switches may be the same in arrangement as a switch used at each node in processor element groups, and hence new hardware need not be developed for these switches. This is another feature of the present invention.

First, the switch used at each node in the processor element groups will be described.

FIGS. 5A to 5C are diagram explanatory of switches in processor element group. FIG. 5A shows the arrangement of processor elements.

As shown in FIG. 1, each subunit of the torus network is arranged such that the 4×4 nodes are connected in a grid configuration. At each grid intersection, serving as a node, is placed a processor element. FIG. 5A shows four grid intersections. At the respective grid intersections are placed switches 300-1, 300-2, 300-3 and 300-4 to which processor elements 310-1, 310-2, 310-3 and 310-4 are connected respectively. Each processor element is comprised of, for example, a CPU, a memory, etc.

To the switch at each grid intersection are connected four adjacent node switches in the four directions (north, south, east and west) and the processor element at the same grid intersection.

FIG. 5B shows the function of the switch. The switch is a 5-input 5-output switch. That is, inputs of the switch includes an input (IN) from a corresponding processor element and inputs from nodes in the four directions (north, south, east and west). Outputs of the switch include an output (OUT) to that processor element and outputs to the nodes in the four directions.

FIG. 5C shows an implementation of the switch. The switch can be implemented by a 5×5 crossbar switch. The switch can thus perform switching data in such a way as to direct input data from the associated processor element to the south node, data from the east node to that processor element, data from the south node to the north node, and so on.

The switch shown in FIGS. 5A to 5C are adapted for a two-dimensional torus network. The switch adapted for a three-dimensional torus network can be implemented by a crossbar switch having seven inputs and seven outputs for north, south, east, west, upper and lower nodes, and a processor element.

Next, the arrangement of the torus network splitting switches (the switches 210 having a small square shape in FIG. 4) will be described.

Figure 6A:
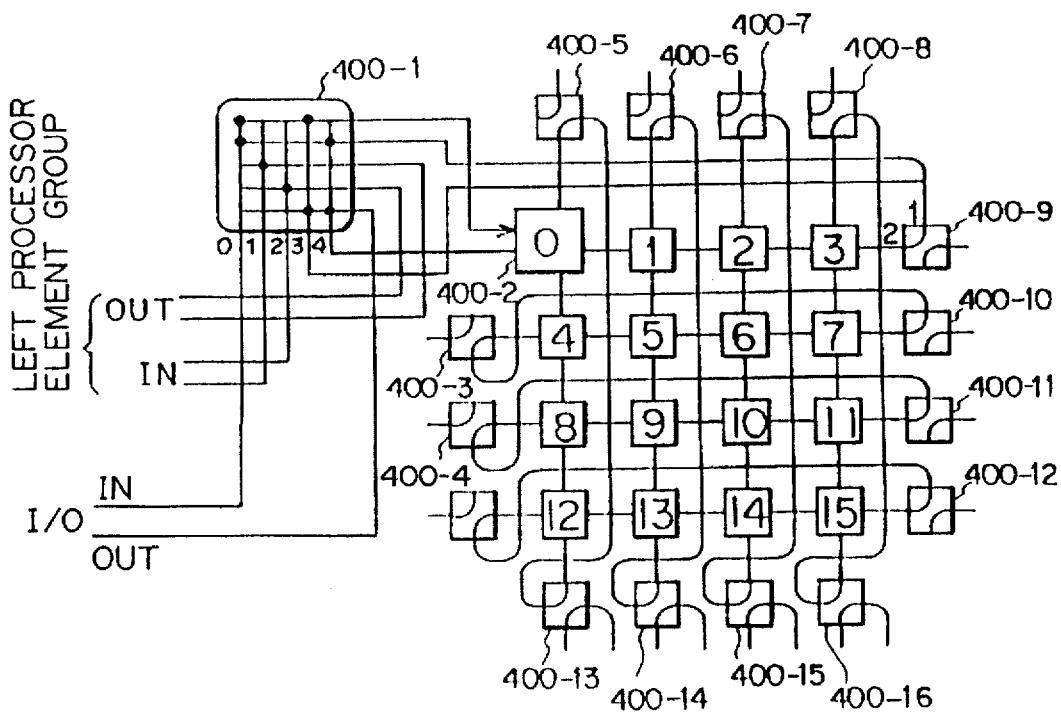
FIGS. 6A and 6B illustrate arrangement of a splitting reconfiguring switch.
Figure 6B:
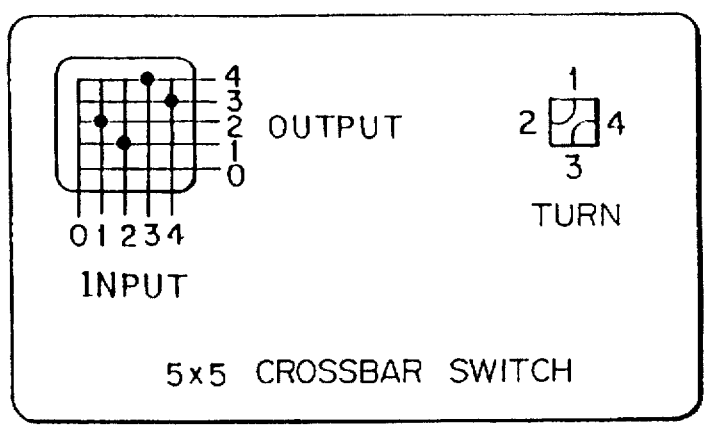

FIGS. 6A and 6B are diagram explanatory of such a splitting switch. A two-dimensional torus network having subunits each of 4×4 processor elements is taken here as an example. FIG. 6A shows one subunit which corresponds to one of the 4×4 processor element groups 201 and includes nodes 0 to 15. Switches 400 correspond to the splitting switches 210 placed around subunits. As can been seen from the entire torus network shown in FIG. 1, the switches are placed between subunits. That is, it can be considered that splitting switches 400-1 to 400-4 are placed between the 16-node subunit shown and another subunit to the left of that subunit shown, the splitting switches 400-5 to 400-8 are placed between that subunit and the upper subunit, the splitting switches 400-9 to 400-12 are placed between that subunit and the right subunit, and the splitting switches 400-13 to 400-16 are placed between that subunit and the lower subunit.

Each of the 4×4 nodes (0–15) is composed of a 5×5 crossbar switch and a processor element. Each of the splitting switches can be implemented by a 5×5 crossbar switch that is the same as the switch at each node. The splitting switch 400-1 indicates a method for connections in the 5×5 crossbar switch. This method will be described later in detail. The other splitting switches 400-2 to 400-16 can be connected in the same way.

FIG. 6B shows a crossbar switch notation. The 5×5 crossbar switch has 5 input lines and 5 output lines that form a grid-like switch with 25 grid intersections. The grid intersections indicated by black dots are in the ON state, the other intersections being in the OFF state. In the figure, inputs 1, 2, 3 and 4 are connected to outputs 2, 1, 4 and 3, respectively- This state indicates connections in the switch notation (TURN) shown on the right-hand side in the figure, separating subunits. When the Grid intersections are switched such that inputs 1, 2, 3 and 4 are connected to outputs 4, 3, 2 and 1, respectively, on the other hand, the THRU switch state shown in FIG. 1 results, thereby permitting the subunit shown and the adjacent subunit to be coupled together.

As can be seen from the foregoing, in order to couple or separate adjacent subunits, each crossbar switch is required to have four inputs and four outputs. With a 5×5 crossbar switch, therefore, one input and one output remain unused.

In the splitting switch 400-1 of FIG. 6A, its input 4 and output 4 are respectively connected to output 2 and input 2 of node 0, its input 3 and output 3 are respectively connected to output 1 and input 1 of the splitting switch 400-9 in order to form a return path within the subunit, its input 2 and output 2 are respectively connected to output 4 and input 4 of node 3 in the left processor element Group, and its input 1 and output 1 are respectively connected to output 3 and input 3 of a splitting switch associated with the left processor element group to form a return path therein.

Thus, the four inputs and the four outputs of the splitting switch 400-1 are used for connections to nodes and splitting switches. The remaining one input and one output can be used for I/O. That is, input 0 and output 0 are connected to a bidirectional switch 211 for connection to a host computer and external devices.

In the splitting switch 400-1 shown in FIG. 6A, the grid intersections of input 1 and output 2, input 2 and output 1, input 3 and output 4, and input 4 and output 3 are each placed in the ON state, thus forming the TURN switch. In this state, the subunit is isolated. In order for nodes 0 to 3 of the subunit to receive input data from a host computer or an external device, it is required only that the grid intersection of input 0 and output 3 or 4 be set to the ON state. Conversely, in order for nodes 0 to 3 to output data to the host computer or external device, the grid intersection at output 0 and input 3 or 4 has only to be set to the ON state.

Figure 7:
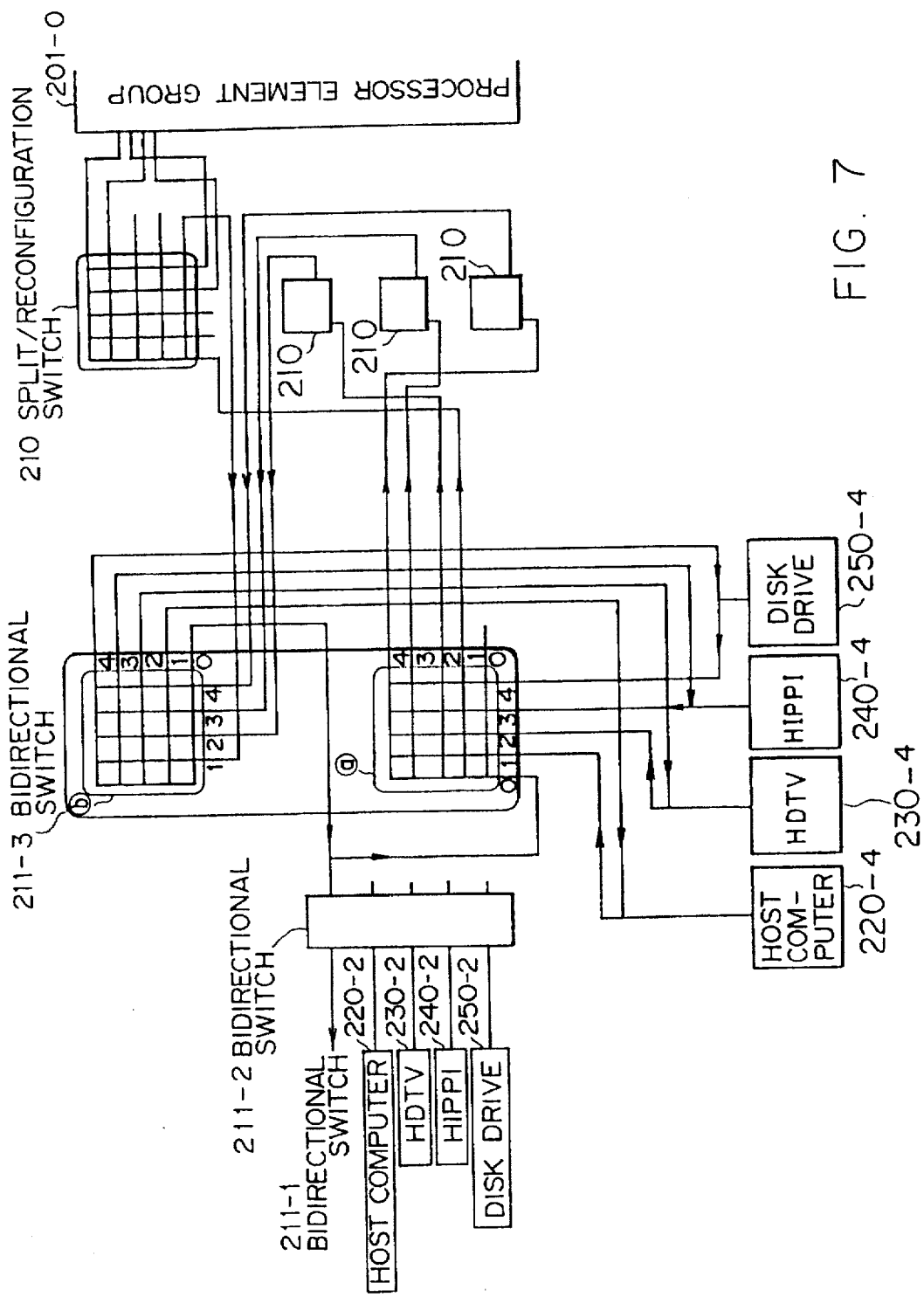
FIG. 7 is a diagram explanatory of an arrangement and connections of a bidirectional switch.

FIG. 7 is a diagram explanatory of the arrangement of the bidirectional switch 211 and the connections between the bidirectional switch 211 and the splitting switch 210 (210 in FIGS. 4 and 7, and 400 in FIG. 6A). In this figure there are shown extended the processor element group 201-0, the surrounding splitting switches 210, the bidirectional switch 211-3 and the high-order bidirectional switch 211-2 in FIG. 4. In this configuration, the bidirectional switch 211-3 is connected to the host computer 220-4, the HDTV 230-4, the HIPPI 240-4, and the disk drive 250-4.

The bidirectional switch 211 can be constructed from a pair of 5×5 crossbar switches (a and b). In order to establish the connection between the splitting switch 210 and the host computer 220 or the external device (230–250) to communicate messages or data in two directions, a pair of crossbar switches are needed. Each crossbar switch is the same in arrangement as the switch within the processor element group 201 and the splitting switch 210.

Input 0 of the crossbar switch a and output 0 of the crossbar switch b are connected together to the high-order bidirectional switch 211-2. Inputs 1 to 4 of the crossbar switch a are respectively connected to the host computer 220-4 and the external devices 230-4, 240-4 and 250-4 which, in turn, are respectively connected to outputs 1 to 4 of the crossbar switch b. Outputs 1 to 4 of the crossbar switch a are respectively connected to the four splitting switches 210 around the processor element group 201-1, which, in turn, are respectively connected to inputs 1 to 4 of the crossbar switch b. This permits two-way communications between the processor element group 201-0 and the host computer 220 or the external device (230 to 250).

If outputs 1 to 4 of the crossbar switch a and inputs 1 to 4 of the crossbar switch b of a bidirectional switch 211 were connected to another bidirectional switch instead of being connected to the split switches 210, a hierarchical connection would be permitted.

Although the above description was made in terms of a two-dimensional torus network, a three-dimensional torus network could also be constructed in the same way. It should be noted, however, that, in the case of a three-dimensional network, a 7×7 crossbar switch is used as the switch at each node in a processor element group. When this type of crossbar switch is used as a split/reconfiguration switch, of its seven inputs and seven outputs, six inputs and six outputs are used for split and reconfiguration, and one input and one output are used for I/O operations with external devices. This type of crossbar switch is also adaptable to bidirectional switches for connecting external devices hierarchically.

As described above, by applying message communications switches at the respective nodes in processor element groups of a torus network to switches for splitting the torus network and bidirectional switches which form quadruple tree structures for hierarchical connection to external devices, a parallel computer system can be configured without the need of development of new hardware for those switches.

What is claimed is:

1. A reconfigurable torus network system, connectable to external devices, comprising:
 a plurality of subunits, each subunit having plural processor elements and a processor element side; and
 reconfiguration switch means, coupled to the external devices and said subunits including a first subunit adjacent to a second subunit, for interconnecting said subunits and the external devices, said reconfiguration switch means including
 a first terminal unit coupled to the processor side of the first subunit,
 a second terminal unit coupled to a return path of the first subunit,
 a third terminal unit coupled to the processor element side of the second subunit,
 a fourth terminal unit coupled to a return path of the second subunit,
 a fifth terminal unit coupled to at least one of the external devices to provide output from at least one of the first and second subunits,
 a sixth terminal unit coupled to at least one of the external devices to provide input from the at least one of the external devices to at least one of the first and second subunits, and
 connection means for electrically connecting said first and fourth terminal units together and said second and third terminal units together when said first and second subunits are connected, and for electrically connecting said first and second terminal units together, said third and fourth terminal units together and either said first and second terminal units or said third and fourth terminal units to said fifth and sixth terminal units when said first and second subunits are disconnected.

2. The reconfigurable torus network system according to claim 1, further comprising:
 input/output switch means coupled between said reconfiguration switch means and the external devices for providing input/output operations between each subunit and the external devices,
 wherein said reconfiguration switch means and said input/output switch means have a same construction.

3. The reconfigurable torus network system according to claim 1, wherein said reconfiguration switch means couples said processor elements in said subunits with a plurality of host computers.

4. The reconfigurable torus network system according to claim 1, wherein said reconfiguration switch means provides an interface with a host computer for each of said subunits, allowing a plurality of users to use the plurality of subunits simultaneously.

5. The reconfigurable torus network system according to claim 1, wherein said reconfiguration switch means allows a user at a host computer to use said plurality of subunits simultaneously.

6. The reconfigurable torus network system according to claim 1, wherein said reconfiguration switch means couples said processor elements in said subunits with a plurality of external disk drives.

7. The reconfigurable torus network system according to claim 1, wherein the external devices coupled via said reconfiguration switch means to said processor elements in said subunits include a high-definition television, a video tape recorder, a high performance parallel interface, and an Ethernet.

8. The reconfigurable torus network system according to claim 1, further comprising:
input/output switch means coupled between said reconfiguration switch means and the external devices for providing input/output operations between each subunit and the external devices, said input/output switch means including a plurality of hierarchically connected switches to couple said processor elements in said subunits via said reconfiguration switch means with the external devices.

9. The reconfigurable torus network system according to claim 8, wherein said reconfiguration switch means are coupled to said input/output switch means at a lowest hierarchical level of said hierarchically connected switches, said reconfiguration switch means also making connections with higher switches of the hierarchically connected switches of said input/output switch means.

10. The reconfigurable torus network system according to claim 8, wherein said reconfiguration switch means is coupled to said input/output switch means at a higher hierarchical level of said hierarchically connected switches of said input/output switch means for correction to the external devices.

11. The reconfigurable torus network system according to claim 8, wherein all of said hierarchically connected switches of said input/output switch means and a plurality of processor-to-processor connection switches at each of a plurality of processor element nodes have a same construction.

12. The reconfigurable torus network system according to claim 9, wherein when said torus network is of one dimension, said switches at the lowest hierarchical level are each implemented by a 5-input 5-output switch, with one input and one output providing connection to a higher switch.

13. The reconfigurable torus network system according to claim 9,
wherein said torus network is of one dimension with processor-to-processor connection switches placed at processor element nodes,
wherein each higher switch and each processor-to-processor connection switch is implemented by two 3-input 3-output switches and
wherein said higher switches provide two-way communications between connected devices.

14. The reconfigurable torus network system according to claim 9,
wherein said torus network is of two dimensions with processor-to-processor connection switches placed at processor element nodes,
wherein said switches at the lowest hierarchical level and the processor-to-processor switches are each implemented by a 5-input 5-output crossbar switch and wherein said switches at the lowest hierarchical level have one input and one output connected to a higher switch.

15. The reconfigurable torus network system according to claim 14,
wherein said torus network is of two dimensions with processor-to-processor connection switches placed at processor element nodes, and
wherein each higher switch and each processor-to-processor connection switch is implemented by two 5-input 5-output crossbar switches.

16. The reconfigurable torus network system according to claim 10, wherein said torus network is of three dimensions and said switches at the lowest hierarchical level are each implemented by a 7-input 7-output crossbar switch, having one input and one output used for connection to a higher switch.

17. A reconfigurable torus network system of processors connected together via inter-processor switches at processor element nodes to form subunits and coupled to external devices, comprising:
reconfiguration switches, one of said reconfiguration switches disposed at switching nodes between every adjacent pair of the subunits, connecting together or disconnecting each adjacent pair of the subunits, each of said reconfiguration switches having first through sixth terminals arranged between adjacent first and second subunits, the first subunit and the second subunit being coupled to allow a return path of the first subunit and the first subunit to be replaced with a return path of the second subunit and the second subunit in turn, and when the first subunit and the second subunit are decoupled, said first and second terminals with which the first subunit is coupled or said third and fourth terminals with which the second subunit is coupled, are connected to said fifth and sixth terminals with which the external device is coupled; and
hierarchical external connection switches connecting the external devices to said reconfiguration switches to provide access between the external devices and each of said subunits, including when the torus network is reconfigured, said hierarchical external connection switches, said reconfiguration switches, and the inter-processor switches being constructed as crossbar switches.

18. A reconfigurable torus network system, comprising:
a plurality of subunits each subunit having plural processor elements connected in the torus network; and
switch means provided between each of adjacent subunits, having a first connection terminal to a first subunit, a second connection terminal to a second subunit, and a third connection terminal to an external device, said switch means selectively connecting the first subunit and at least one of the second subunit and the external device by coupling the first connection terminal to at least one of the second connection terminal and the third connection terminal, the first subunit and the second subunit, adjacent to each other, being coupled together through the first connection terminal and the second connection terminal to allow a return path of the first subunit and the first subunit to be replaced with a return path of the second subunit and the second subunit in turn, and when the first subunit is decoupled from the second subunit by decoupling the first connection terminal from the second connection terminal, the first subunit is coupled to the external device by coupling the first connection terminal to the third connection terminal.

* * * * *